US005458938A

United States Patent [19]

Nygard et al.

[11] Patent Number: 5,458,938

[45] Date of Patent: Oct. 17, 1995

[54] MOUNTING LAMINATE HAVING RECESSED ADHESIVE AREAS

[75] Inventors: James C. Nygard, Maplewood; Dorman N. Thompson, Woodbury; Lynette M. Aadland, Lakeville, all of Minn.

[73] Assignee: Minnesota Mining and Manufacturing Company, St. Paul, Minn.

[21] Appl. No.: 101,610

[22] Filed: Aug. 3, 1993

[51] Int. Cl.[6] .......... B32B 3/10

[52] U.S. Cl. .......... 428/40; 428/137; 428/138; 428/192; 428/195; 428/212; 428/220; 428/354; 428/355; 40/594; 40/595

[58] Field of Search .......... 428/40, 138, 137, 428/131, 192, 220, 212, 343, 354, 355, 195; 40/594, 595

[56] References Cited

U.S. PATENT DOCUMENTS

| | | | |
|---|---|---|---|
| Re. 24,906 | 12/1960 | Ulrich | 206/59 |
| 1,974,465 | 9/1934 | Lewis | 428/138 |
| 2,453,441 | 11/1948 | LaFair | 428/138 |
| 2,552,664 | 5/1951 | Burdine | 154/53.5 |
| 3,691,140 | 9/1972 | Silver | 260/78.5 |
| 3,857,731 | 12/1974 | Merrill, Jr. et al. | 117/122 |
| 3,887,414 | 6/1975 | Cohn | 156/108 |
| 3,900,642 | 8/1975 | Michel | 428/40 |
| 4,010,299 | 3/1977 | Hershey, Jr. et al. | 428/44 |
| 4,166,152 | 8/1979 | Baker et al. | 428/522 |
| 4,460,634 | 7/1984 | Hasegawa | 428/124 |
| 4,768,810 | 9/1988 | Mertens | 282/12 |
| 4,786,696 | 11/1988 | Bohnel | 426/88 |
| 4,822,017 | 4/1989 | Griesmyer | 271/2 |
| 4,848,798 | 7/1989 | Moor | 281/31 |
| 4,966,477 | 10/1990 | Vitale | 400/522 |
| 4,986,573 | 1/1991 | Brumhoefer | 283/62 |

FOREIGN PATENT DOCUMENTS

| | | |
|---|---|---|
| 0439941A1 | 8/1991 | European Pat. Off. . |

*Primary Examiner*—Nasser Ahmad
*Attorney, Agent, or Firm*—Gary L. Griswold; Walter N. Kirn; William L. Huebsch

[57] ABSTRACT

A mounting laminate can be used as a mounting sheet on which undersize items can be mounted for processing in devices equipped with stacked sheet feed mechanisms. The mounting laminate has three primary layers: (a) a masking layer, preferably paper, formed with discrete openings, preferably circles, (b) a back layer, preferably a thin plastic film, and (c) a pressure-sensitive adhesive layer adhering the masking layer to the back layer and extending across each of the openings.

18 Claims, 5 Drawing Sheets

MOUNTING LAMINATE HAVING RECESSED ADHESIVE AREAS

FIELD OF THE INVENTION

The invention relates to mounting laminates to which pieces of paper can be adhered by contact, either temporarily or permanently. One aspect of the invention is concerned with mounting laminates that can be used to collect documents, including such mounting laminates that are used as a carrier sheet for such documents while they are read, copied or otherwise processed by devices equipped with stacked sheet feed mechanisms. Another aspect of the invention is concerned with such mounting laminates in the form of sheets or strips that can be used to attach documents to substrates in a desired location, or can be incorporated into envelopes and used to seal the envelopes.

DESCRIPTION OF THE RELATED ART

Optical scanners are widely used to convert printed data into electrical pulses that can be stored and processed by electronic computers. The printed data may be on small pieces of paper (such as receipts, vouchers, credit card memoranda, or ticket stubs). Because of their small and varied sizes and thicknesses, it has been necessary to tape those pieces to larger standardized carrier sheets for use in a stacked sheet feed mechanism. The taping process has been time-consuming and expensive and, when individual memoranda need to be recovered after being processed, attempts at separating them from the tape sometimes cause damage.

Other types of devices that are equipped with stacked sheet feed mechanisms are sometimes used to process other types of items that are too small to be handled directly. For example, for processing by a microfilm or a photocopy device, undersize photographs and bank checks or other negotiable instruments, etc. typically are taped to larger carrier sheets that can be stacked for automated microfilming or photocopying. It also has been necessary in some instances to tape undersize items such as rolodex cards, checks, labels, and name tags to advance them through a computer printer.

U.S. Pat. No 4,822,017 (Griesmyer) primarily concerns the problem of advancing small, odd-sized items into a computer printer that has a sheet feed mechanism. FIGS. 1–3 show a carrier sheet (12) that is formed with a plurality of openings. A strip of pressure-sensitive adhesive tape (32) is adhered to the back of the carrier sheet with a portion of its adhesive layer exposed through each of the openings. Vertical retaining strips (36) and (38) are so adhered to the face of the carrier sheet that their edges can be lifted to hold a card (50) flat. However, the patent says in connection with FIG. 6 that exposed adhesive layers alone can hold small items in place without need for the retaining strips. The carrier sheet of FIG. 4 has ten openings which together occupy about 15% of the useful area of the carrier (excluding its borders).

Although the adhesive areas of carrier sheets illustrated in the Griesmyer patent are recessed from the face of the carrier sheet, the patent does not indicate any advantage in doing so. To the contrary, the patent says that instead of using adhesive strips, "adhesive can be applied directly to the top surface of the sheet 12 to form the adhesive strips 32" or the adhesive strips 32 can be "affixed to the top surface of the sheet 12" (col. 4, lines 7–12). The Griesmyer patent does not suggest that its carrier sheet could be fed from a stack into a sheet feed mechanism.

A carrier sheet like that of FIGS. 1–3 of the Griesmyer patent has been marketed by BabsCo Company of Houston, Tex. and is labelled "Large Rolodex Card Carrier Sheet". The tape covering its three openings is believed to be Post-it brand Correction & Cover-up Tape #658 from 3M, which is a repositionable pressure-sensitive adhesive tape based on solid, inherently tacky, elastomeric microspheres. This and similar Babsco carrier sheets have been marketed as "U-Stik-It" Carrier Sheets.

U.S. Pat. No. 4,966,477 (Vitale) provides a paper holder that permits undersize pieces of paper to be fed into a typewriter. The paper holder has a flexible backing sheet to which two flexible strips are adhered. The strips have opposed recesses for holding the undersize pieces of paper.

U.S. Pat. No. 2,552,664 (Burdine) is not concerned with mounting sheets or stacked sheet feed mechanisms but relates to sheet or strip materials that are similar in certain respects to mounting laminates according to the present invention. U.S. Pat. No. 2,552,664 concerns a three-ply laminate which is adapted to adhere two articles together. In the laminated sheet of FIGS. 1–3, the central ply (10) can be a sheet of paper, both sides of which bear a pressure-sensitive adhesive layer, while each of the two outer plies (20, 30) can be a layer of paper formed with a plurality of spaced elongated openings (31) that expose the adhesive. Because the adhesive is recessed, sheets of the laminate can be stacked without adhering together. The openings in the outer plies are offset so that when the laminated sheet is used to adhere to objects together, pressure against solid portions of one outer ply that are immediately over openings of the other outer ply causes the adhesive to contact the adjacent object.

SUMMARY OF THE INVENTION

The present invention provides a novel mounting laminate which can be used for various purposes particularly including as a carrier sheet for undersize items to be processed through a stacked sheet feed mechanism so that such items can be quickly and firmly adhered to the mounting laminate. When used as such a carrier sheet the mounting laminate provides the advantage of securely but releasably holding a high density of such items, thereby maximizing the effectiveness of the device into which the sheet feed mechanism feeds the mounting laminate. Another use of the mounting laminate according to the present invention is as a bulletin board or message center for displaying notes, business cards, photos, receipts, etc. in an attractive, secure, compact and convenient manner. Mounting laminates according to the present invention can also be put to many other uses, such as being attached to a personal computer for temporarily mounting pieces of paper, or being incorporated in envelopes to attach flaps of the envelopes in closed positions.

Briefly, the mounting laminate according to the present invention adapted for use as a carrier sheet for undersize items to be processed through a stacked sheet feed mechanism includes (1) a masking layer including an imperforate border portion and a perforate portion bounded on at least one side by the border portion having discrete openings that (a) extend substantially uniformly over the entire area of the perforate portion, (b) occupy at least 25% of the area of the perforate portion, (c) each have an area generally in the range of 0.316 to 3.88 square centimeters (0,049 to 0.6 square inches), (d) are each of a size such that a circle of from 6.5 to 20 millimeters (0.25 to 0.8 inch) in diameter fits within the opening, and (e) are spaced apart by not more than 15 millimeters (0.6 inch); (2) a back layer that has a Tabor stiffness of less than 3.0; and (3) a tacky pressure-sensitive adhesive layer that (a) adheres the masking layer to the back layer and (b) extends across each of the openings, which adhesive on the back layer has a 90° Adhesion Value (as described below) of at least 2 Newtons per 100 millimeter of width (2 ounces per inch of width), the laminate having a uniform thickness of from 0.05 to 0.5 millimeter (0.002 to 0.02 inch) and a Tabor stiffness of from 0.02 to 7.0 Tabor Stiffness Units. If that mounting laminate were to have a Tabor stiffness substantially greater than the aforementioned range, it might be rejected by some stacked sheet feed mechanisms; or if it were to have a Tabor stiffness substantially lower than the aforementioned range, it might be wrinkled by a stacked sheet feed mechanism.

Because most stacked sheet feed mechanisms in current use can be adjusted to handle sheets having thicknesses from 0.1 to 0.4 millimeter (0.004 to 0.015 inch), the overall thickness of mounting laminates intended for use as a carrier sheet for undersize items to be processed through a stacked sheet feed mechanism preferably is within that range. More preferably, its overall thickness does not exceed 0.2 millimeter (0.008 inch). Otherwise, a stacked sheet feed mechanism might sense that the mounting laminate plus mounted items are too thick to process or, even worse, a relatively thick mounted item might jam the mechanism. The imperforate border portion of such mounting laminates should be at least 13 millimeters (0.5 inch) in width. Otherwise, some mechanisms might sense an opening to be a sheet edge and so reject a mounting laminate. Also, it is often advantageous that the imperforate border on such mounting laminates extend around all sides of the perforate portion so that the mounting laminate can be fed through the feed mechanism in any edgewise direction.

Also, to permit a large number of such mounting laminates to be fed from a stack without sticking, the thickness of the masking layer preferably is at least 0.025 millimeter (0.001 inch). Substantially lesser thicknesses might produce two problems. First, the exposed face of the back layer might contact tacky adhesive that extends across openings of the underlying mounting laminate to prevent the mounting laminates from sliding across each other in a stacked sheet feed mechanism. Second, a driving roller of the stacked sheet feed mechanism might contact the adhesive.

When the mounting laminate according to the present invention has the aforementioned preferred thickness of 0.05 to 0.2 millimeter (0.002 to 0.008 inch) and the masking layer has the aforementioned preferred minimum thickness of 0.078 millimeter (0,003 inch), the masking layer preferably provides at least 35% of the thickness of the mounting laminate and may be quite thin. To afford adequate strength and conformability, such a thin back layer can be of a plastic film such as cellulose acetate, polyethylene, polypropylene, or bi-axially oriented polyethyleneterephthalate.

For many applications, it will be desirable that the back layer have the same coefficient of thermal expansion and moisture absorption properties as the masking layer to restrict temporary or permanent curling of the mounting laminate during use. Thus, for those applications it may be necessary to form the back layer and the masking layer from the same material (e.g., both from sheets of paper or both from sheets of polymeric material) or from materials with essentially the same thermal expansion and moisture absorption properties, and to be sure that even if such materials are used that coatings on such materials do not effect their properties such that at least temporary curling can occur during a change in moisture or temperature conditions that could, for example, result in permanent deformation in the layer of adhesive after the mounting laminate was no longer curled.

The openings can have a variety of shapes, such as a user's logo, but preferably are circular or diamond shaped or squarish so that any item to be attached can be contacted by a high proportion of the pressure-sensitive adhesive at each opening, The openings preferably are as close together as possible as long as the mounting laminate does not become too flimsy. However, when the mounting laminate is to be used as a carrier sheet in stacked sheet feed mechanisms, there should be adequate portions of the masking layer between the openings such that the rollers of those mechanisms do not contact the exposed areas of pressure-sensitive adhesive. Preferably the spacing between adjacent openings is from 4 to 10 millimeters (0.16 to 0.4 inch).

To ensure that mounted items do not come off in a stacked sheet feed mechanism, each such item should contact a significant portion of the adhesive that is exposed at each of the openings, preferably at least 80% of the pressure-sensitive adhesive area at each opening. To accomplish this even when the mounting laminate is used to mount non-conformable items, the openings should be large enough so that the back layer at each opening can be pushed by ones fingertips without breaking until the face of the pressure-sensitive adhesive layer reaches the plane of the surface of the masking layer opposite the layer of adhesive. Preferably the back layer has a Tabor stiffness of less than 3.0 and so is supple enough to enable the back layer to be pushed well beyond that plane. Because many items to be mounted on the novel mounting laminate will be conformable, it may be possible to employ a less supple back layer, but it may be impractical to market a mounting laminate according to the present invention that could not be used with items that are poorly conformable.

Because openings of smaller breadth provide smaller areas of contact between the pressure-sensitive adhesive and items to be mounted on the novel mounting laminate, the adhesive on the back layer should have a higher 90° Adhesion Value than the minimum stated above when the breadth of the openings is near the minimum of the aforementioned range. Regardless of the size of the openings, when the novel mounting laminate is to be used in a stacked sheet feed mechanism, the pressure-sensitive adhesive on the back layer preferably has a 90° Adhesion Value of at least 2 Newtons per 100 millimeters of width (2 ounces per inch of width).

When the mounting laminate has the above-discussed preferences in 90° Adhesion Value, opening shape, size and spacing, all areas of any mounted item along its perforate portion are contacted by the pressure-sensitive adhesive. Doing so tends to flatten any wrinkling of the item and to hold it flat so that an edge of the item doesn't catch another sheet sliding into an exit tray of a processing device in which the mounting laminate is already positioned.

When the mounting laminate is to be used as a collector/organizer, bulletin board, or the like, it can include a layer of adhesive on the exposed surface of the back layer by which the mounting laminate can be mounted on a wall or other object. Any such layer of adhesive is hereinafter referred to as an "external adhesive layer" to distinguish it from the aforementioned pressure-sensitive adhesive layer which is internal except at the openings. The external adhesive layer can be heat-activated or solvent-activated but, for convenience, preferably is pressure-sensitive.

Because a continuous external adhesive layer would prevent the back layer from flexing at the openings if the external adhesive layer were adhered to a rigid substrate, the external adhesive layer preferably is offset from the openings, e.g., is aligned with the parts of the perforate portion of the masking layer between the openings and/or with the border portion of the masking layer. Such flexing also would be permitted by an external adhesive layer in the form of spots applied only to areas of the back sheet that are out of registry with openings of the masking layer.

The ultimate design of mounting laminates according to the present invention in the form of either sheets or strips requires a balance between the stiffness of the back layer, the breadth of the openings, and the thickness of the masking layer. For example, the back layer should be more supple when the openings are smaller or when the masking layer is thicker.

A variety of well-known pressure-sensitive adhesives can be used for the interior adhesive layer of the novel mounting laminate. Particularly useful are those of co-assigned U.S. Pat. No. Re. 24,906 (Ulrich). To permit mounted items to be removed without damage, the interior pressure-sensitive adhesive preferably is repositionable, and this also affords the economy of reusability of the novel mounting laminate. The term "repositionable" indicates the ability of an adhesive to be repeatedly adhered to and removed from an object, or vice versa. While some conventional pressure-sensitive adhesives are repositionable, an especially useful unconventional class is based on solid, inherently tacky, elastomeric microspheres, such as pressure-sensitive adhesives disclosed in the following co-assigned patents: U.S. Pat. No. 3,691,140 (Silver), 3,857,731 (Merrill et al.), 4,166,152 (Baker et al.), and 4,786,696 (Bohnel), and EP No. 439,941 (Bohnel et al.). The latter discloses a high tack pressure-sensitive adhesive that is especially useful in some mounting laminates according to the present invention by better assuring that mounted items will not come loose in a stacked sheet feed mechanism.

DESCRIPTION OF THE DRAWINGS

The present invention will be further described with reference to the accompanying drawing wherein all views are schematic, like parts are identified with like reference numerals in the several views, and wherein.

DESCRIPTION OF THE PREFERRED EMBODIMENTS

Figure 1:
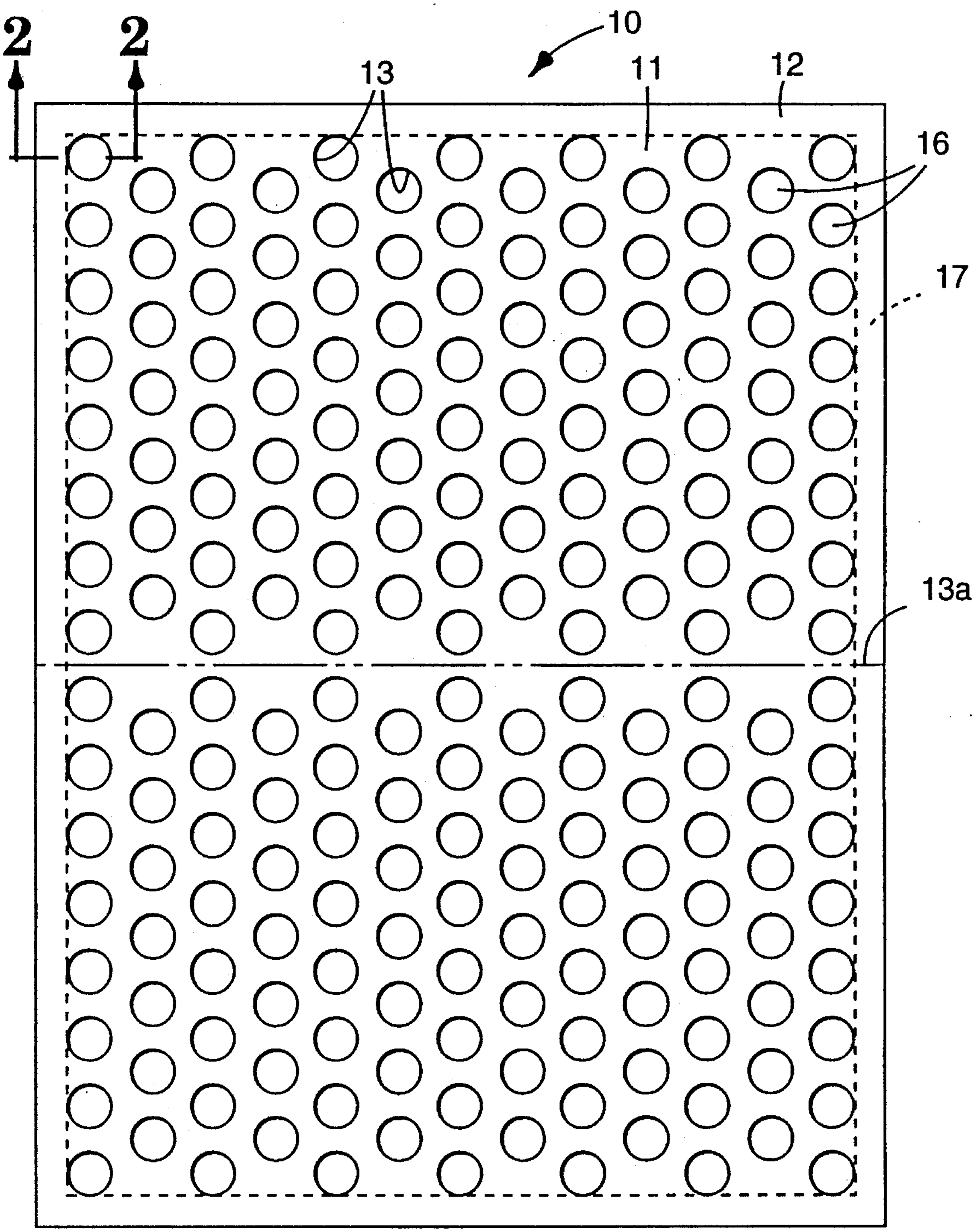
FIG. 1 illustrates a first embodiment of a mounting laminate according to the present invention in the form of a sheet which can be used as a desk top or notebook collector/organizer or as a bulletin board or message center.
Figure 2:
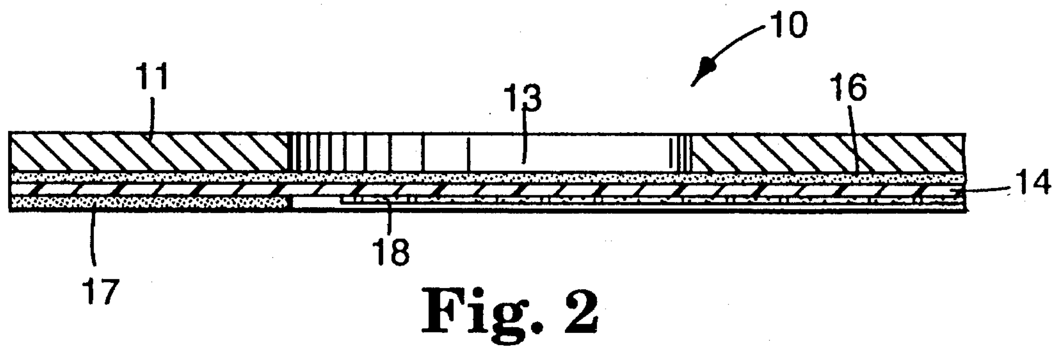
FIG. 2 is a fragmentary cross section, greatly enlarged, taken approximately along line 2—2 of FIG. 1.

Referring to FIGS. 1 and 2, there is illustrated a first embodiment of a mounting laminate according to the present invention in the form of a mounting sheet 10 which can be used as a desk top or notebook collector/organizer or as a bulletin board or message center. The mounting laminate or mounting sheet 10 includes a masking layer 11 that includes an imperforate border portion 12, and an inner portion within the border portion 12. The inner portion of the masking layer 11 has a large number of discrete circular openings 13. A back layer 14 has been coated with a pressure-sensitive adhesive layer 16 by which it has been laminated to the masking layer 11 with which both the back layer and pressure-sensitive adhesive layer are coextensive. The adhesive layer 17 may or may not be covered by a liner (not shown). Covering that portion of the exposed face of the back layer 14 which is aligned with the imperforate border portion 12 is an external adhesive layer 17 by which the mounting sheet 10 can be mounted on a wall or other object. Covering substantially the entire nonadhesive portion of the exposed face of the back layer 14 is a low-adhesion backsize coating 18 that allows adjacent mounting sheets 10, when stacked, to be easily separated, even if the weight of the stack were to cause the exposed surface of the back layer 14 of one mounting sheet 10 to contact areas of the pressure-sensitive adhesive layer 16 that are exposed by the openings 13 of an adjacent mounting sheet 10.

The pattern of openings 13 through the inner or perforate portion of the mounting sheet 10 is interrupted to permit the mounting sheet 10 to be cut in half along the phantom line 13*a*, leaving a continuous imperforate border around each half sheet.

Figure 3:
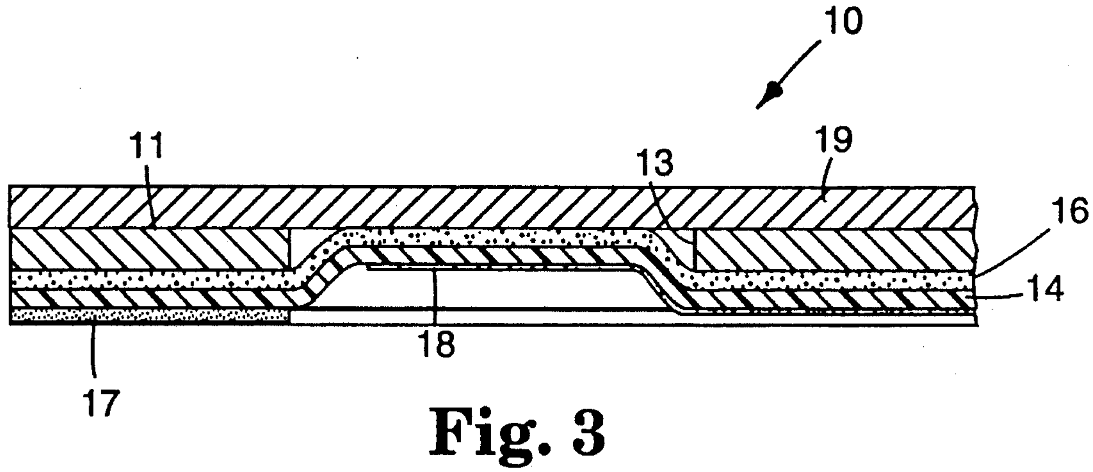
FIG. 3 is a fragmentary cross section like that of FIG. 2 showing a fragment of a document mounted on the mounting laminate of FIG. 1.

In FIG. 3, a piece of paper 19 has been mounted on the masking layer 11 of the mounting sheet 10 by a person who pressed his or her fingertips against the back layer 14 or the piece of paper 19 at the openings 13 or both to force part of the paper 19 and the pressure-sensitive adhesive layer 16 into contact across a significant portion of each opening 13 overlaid by the paper 19.

Figure 4:
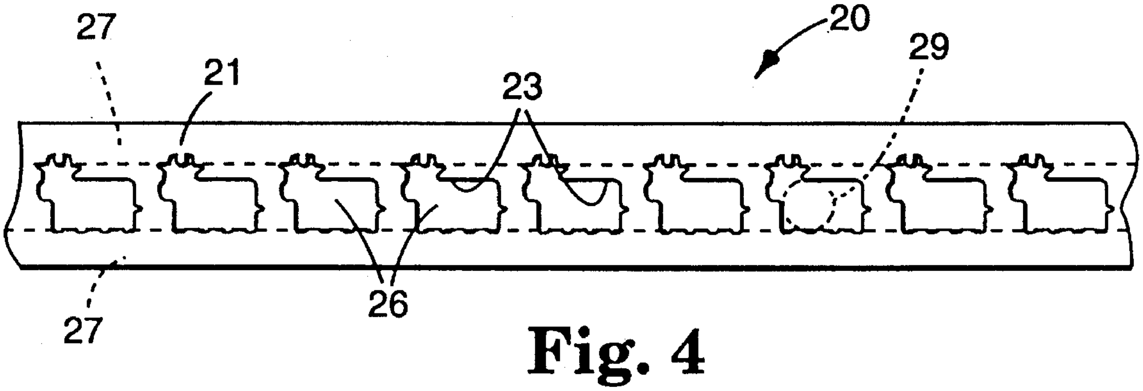
FIG. 4 shows a second embodiment of a mounting laminate according to the present invention in strip form that can be put to uses similar to those intended for the first embodiment thereof.

FIG. 4 illustrates a second mounting laminate according to the present invention that is in the form of a mounting strip 20 including a masking layer 21 having a low-adhesion backsize coating (not shown) covering its exposed face. The masking layer 21 includes an imperforate border portion along two opposite sides and a perforate portion bounded by the border portion having discrete openings 23, each in the shape of a cow. Extending across each of the openings 23 is a back layer (not shown) that has been coated with pressure-sensitive adhesive layer 26 by which it has been laminated to the masking layer 21. The back layer, pressure-sensitive adhesive layer 26, and masking layer 21 are coextensive. Covering each edge of the exposed face of the back layer is an external adhesive layer 27 which does not extend across the portion of the back layer bridging the openings 23.

For economy, the masking layer 21 preferably is paper. The exposed face of the paper masking layer 21 may be glazed to enhance slidability, and the glazing may be colored for an attractive appearance that affords high contrast to pieces of paper and other items to be mounted.

By employing a low-adhesion backsize coating on the exposed surface of the masking layer 21, a plurality of the mounting strips 20 can be formed into a pad by pressing the pressure-sensitive adhesive 26 at openings 23 of each of the mounting strips 20 against the masking layer 21 of the underlying mounting strip 20. Because of the low-adhesion backsize coating, single mounting strips 20 can be peeled from the pad for individual use. Instead a plurality of the novel mounting strips 20 can be formed into a pad by using an edging or padding adhesive of the prior art.

Figure 5:
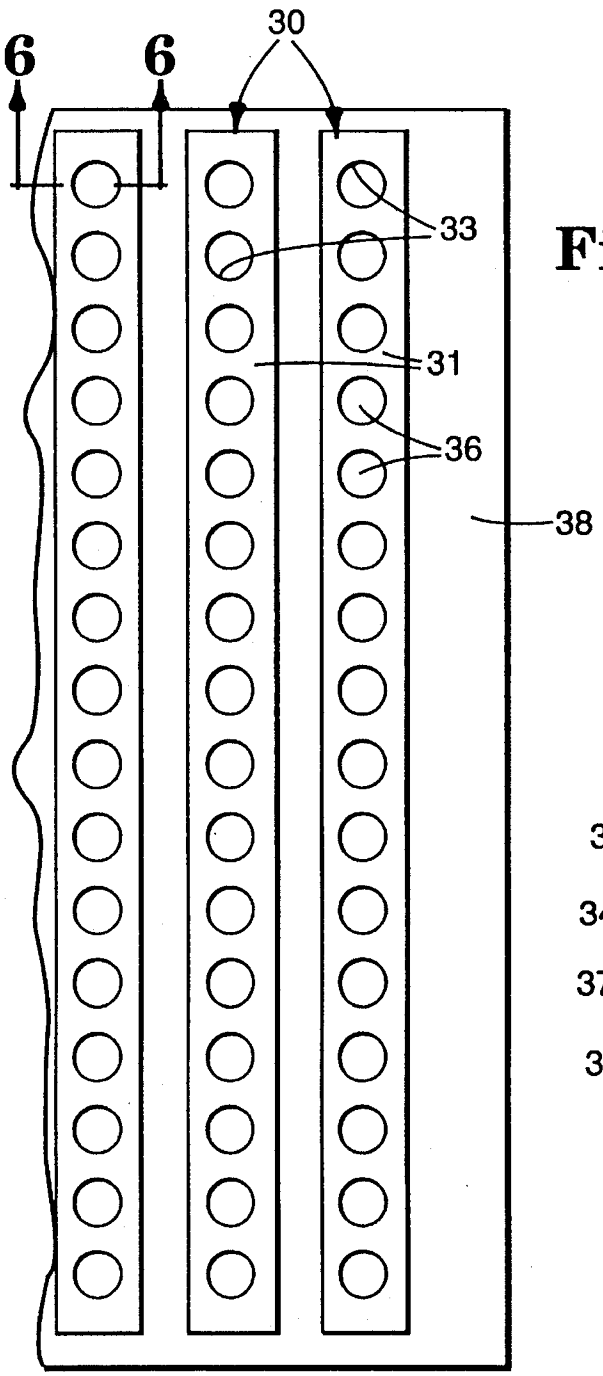
FIG. 5 shows three strips according to a third embodiment of a mounting laminate according to the present invention, each of which strips can be put to uses similar to those intended for the first and second embodiments thereof.

FIG. 5 illustrates three mounting strips 30 according to a third embodiment of a mounting laminate according to the present invention. Each of the mounting strips 30 has a masking layer 31 that has been perforated to form a row of discrete circular openings 33. The back layer 34 has been coated with a pressure-sensitive adhesive layer 36 by which it has been laminated to the masking layer 31. The back layer 34, pressure-sensitive adhesive layer 36, and masking layer 31 are coextensive. Covering that portion of the exposed face of the back layer 34 which is aligned with the portion of the masking layer 31 around the openings 33 is an external adhesive layer 37 which does not extend across the circular openings 33. The external adhesive layer 37 temporarily adheres the mounting strips 30 to a low-adhesion backsize coated carrier 38 from which they can be peeled to be mounted on a wall or other object by the external adhesive layer 37.

Figure 6:
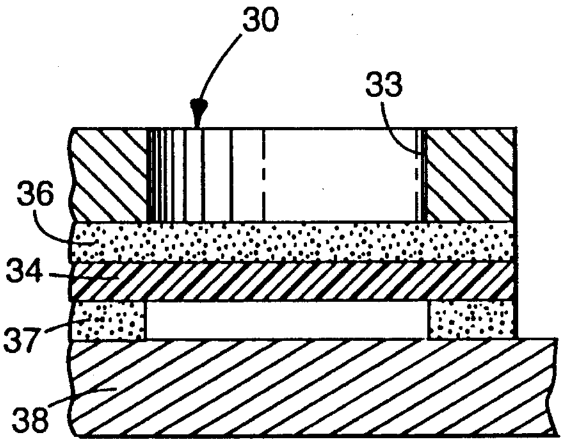
FIG. 6 is a fragmentary cross section, greatly enlarged, taken generally along line 6—6 of FIG. 5.

Each of the mounting strip 20 of FIG. 4 or the mounting strip 30 of FIGS. 5 and 6 can be adhered by its external adhesive layer 27 or 37 across the top edge of the back of each page of a flip chart or note pad. Each of the pages can then be removed and adhered to a wall by pressing at the openings to force its pressure-sensitive adhesive layer 26 or 36 against the wall. As compared to prior flip charts or note pads that have pressure-sensitive adhesive strips for the same purpose, such use of the mounting strips 20 or 30 according to the present invention eliminates the need to guard the adhesive layer 26 or 36 on the mounting strip 20 or 30 from being damaged by incidental contact with other surfaces.

Figure 7:
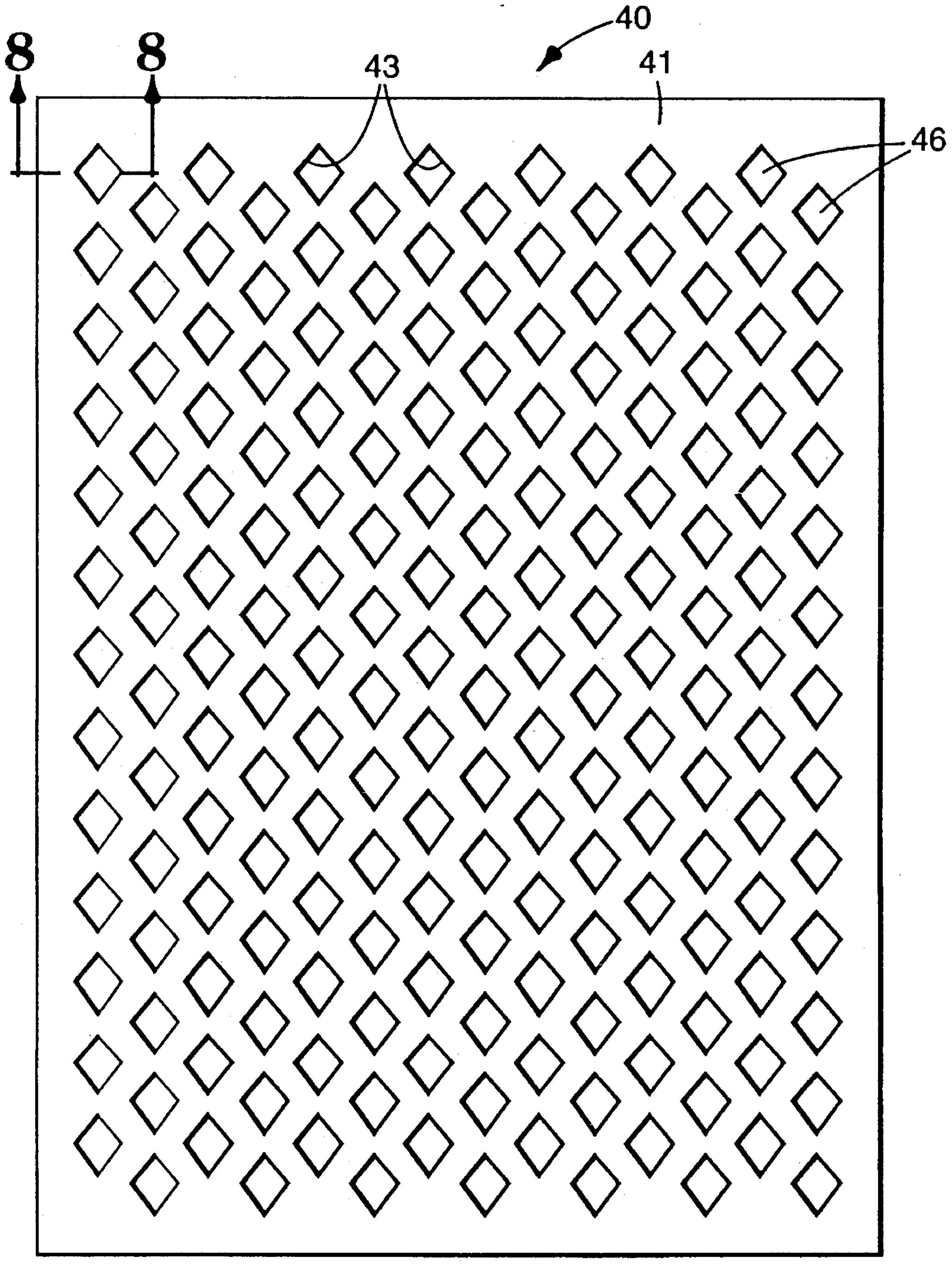
FIG. 7 illustrates a fourth embodiment of a mounting laminate according to the present invention, which mounting laminate is designed for use as a carrier sheet for undersize items to be processed through a stacked sheet feed mechanism.
Figure 8:
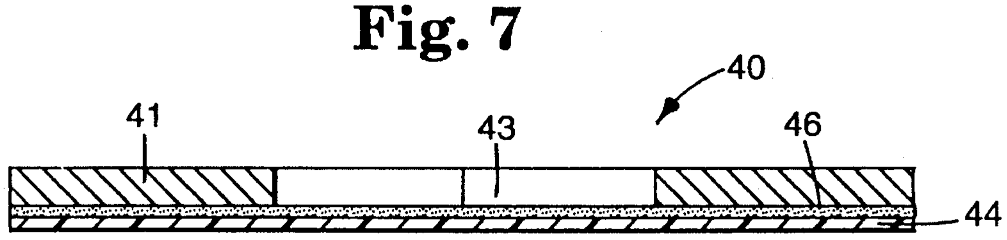
FIG. 8 is a fragmentary cross section, greatly enlarged, taken generally along line 8—8 of FIG. 7.

FIGS. 7 and 8 illustrate a fourth embodiment of a mounting laminate according to the present invention in the form of a mounting sheet 40. The mounting laminate or mounting sheet 40 has a masking layer 41 that has an imperforate border portion, and has been perforated along an inner or perforate portion to form a large number of discrete diamond-shaped openings 43 through the perforate portion. A back layer 44 has been coated with a pressure-sensitive adhesive layer 46 by which it has been laminated to the masking layer 41. The back layer 44, pressure-sensitive adhesive layer 46, and masking layer 41 are coextensive. It may be desirable to cover the exposed face of the back layer 44 with a low-adhesion backsize coating (not shown) that would allow the mounting sheet 40, when stacked to be processed through a stacked sheet feed mechanism, to be easily separated from adjacent sheets, even if the weight of the stack were to cause the exposed surface of the back layer 44 of one sheet to contact areas of the pressure-sensitive adhesive layer 46 of an adjacent mounting sheet 40.

To hold the mounting sheet 40 in a ring binder, its imperforate border portion along one edge can be enlarged and can be punched with holes (not shown) matching the rings of the binder.

Figure 9:
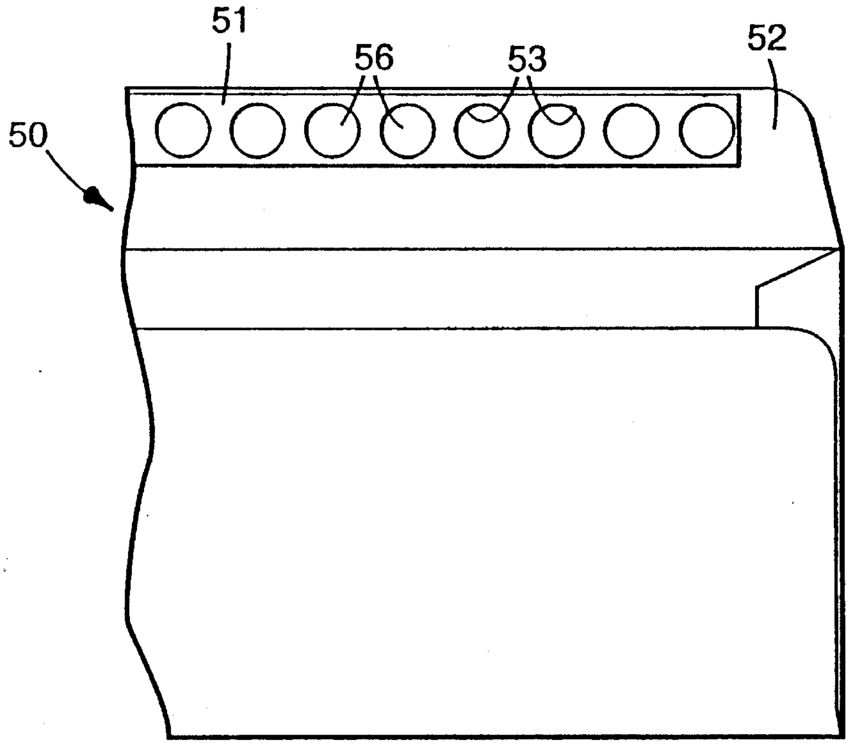
FIG. 9 illustrates a fifth embodiment of mounting laminate according to the present invention that is incorporated in a mailing envelope for use in sealing shut the flap of the envelope.

FIG. 9 illustrates a fifth embodiment of a mounting laminate according to the present invention that is in the form of a strip incorporated along a distal edge portion of a flap 52 on an envelope 50. Along the distal edge portion of the flap 52 has been applied a narrow pressure sensitive adhesive layer 56, which in turn has been covered with a coextensive masking layer 51, e.g., a strip of bond paper. A row of circular openings 53 through the masking layer 51 allows the exposed circles of pressure-sensitive adhesive along the layer 56 to seal the envelope 50 when the flap 52 is closed and fingertip pressure is applied to the flap at the openings 53. The pressure-sensitive adhesive preferably is one that builds adhesion to paper over a period of time.

Prototypes of the envelope 50 and other envelopes were stored in a cardboard box to equal the number of envelopes for which the box is used commercially. After several months at ordinary room temperatures, the prototypes were undamaged and could be sealed permanently by closing the flap 52 and manually pressing the flap 52 opposite the exposed circles of pressure-sensitive adhesive along the layer 56 to engage them with the adjacent surface of the closed envelope 50.

Figure 10:
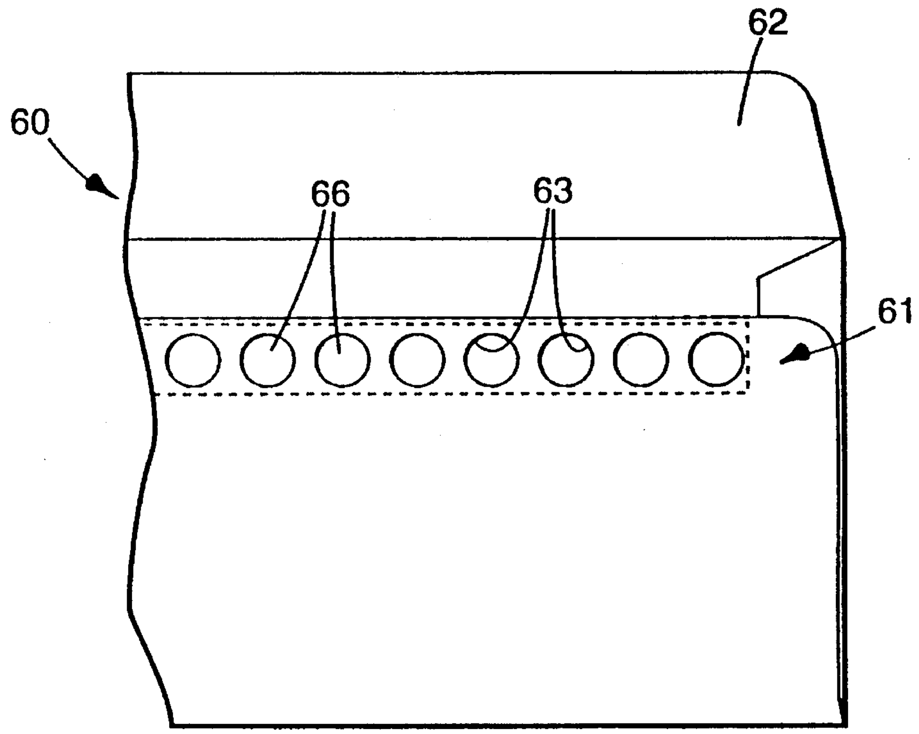
FIG. 10 illustrates a sixth embodiment of mounting laminate according to the present invention that is incorporated in a mailing envelope for use in sealing shut the flap of the envelope.

FIG. 10 illustrates a sixth embodiment of a mounting laminate according to the present invention that is in the form of a strip incorporated along one side surface portion 61 of an envelope 60 defining an outer side surface of the envelope 60 that will be contacted by a flap 62 of the envelope 60 when the flap 62 is closed. A row or series of openings 63 were punched through the portion 61 of the envelope. A strip of pressure-sensitive adhesive tape 65 is adhered to the inner surface of the portion 61 so that circles 66 of adhesive are exposed along the outer surface of that portion 61. The envelope 60 can be permanently sealed by pressing its flap 62 against the circles 66 of adhesive.

TEST FOR 90° ADHESION VALUE

Using a standard stainless steel panel as described in ASTM D3330-83, a test specimen (2.54 centimeter or 1 inch in width) is removed at a 90° angle at controlled conditions as described in ASTM D3330-83, but using a 90° peel jig that holds the steel panel at 90° to the line of travel of the lower jaw of the adhesion tester. One end of the specimen is adhered by its adhesive layer to the steel panel, and the other end is attached via a leader to the upper jaw of the adhesion tester.

EXAMPLE 1

A prototype of a mounting laminate or mounting sheet 10 according to the present invention was made as described with reference to FIGS. 1 and 2 except that the external adhesive layer 17 and the low-adhesion backsize coating 18 were omitted. The prototype had the following significant features:

| | |
|---|---|
| dimensions of the | 21.6 × 27.9 centimeters (8.5 × 11 |

-continued

| | |
|---|---|
| mounting sheet 10 | inches) |
| masking layer 11 | 20# bond paper, 0.01 millimeter (0.004 inch) in thickness |
| imperforate border 12 | 13 millimeters (0.5 inch) width at each edge |
| circular openings 13 | 11.1 millimeters (0.4375 inch) in diameter |
| spacing between adjacent openings 13 | 6 millimeters (0.25 inch) |
| back layer 14 | cellulose acetate, 0.025 millimeters (0.001 inch) in thickness |
| pressure-sensitive adhesive layer 16 | 3M repositionable tape No. 811, 0.025 millimeter (0.001 inch) in thickness, made as taught in U.S. No. 3,691,140 (Silver) |

The circular openings 13 occupied 41% of the perforated portion of the masking layer 11. The pressure-sensitive adhesive on the back layer had a 90° Adhesion Value of 2 Newtons per 100 millimeters of width (2 ounces per inch of width).

Testing

An experiment was carried out using persons who are accustomed to taping travel expense vouchers onto carrier sheets to permit them to be fed from stacks into an optical scanner. These persons were timed while doing so with 50 vouchers and then mounting 50 other vouchers directly onto mounting sheets of Example 1. The customary taping method required 1.93 minutes per voucher while the mounting onto mounting sheets of Example 1 required 1.41 minutes per voucher.

The mounting sheets with mounted vouchers were stacked and then scanned by a Kodak Image Link Scanner 900s without any failures. After doing so, the vouchers were easily removed without damage.

EXAMPLE 2

A prototype of a mounting laminate or mounting strip 20 according to the present invention was made as described with reference to FIG. 4 except that the external adhesive layer 27 covered the entire back layer. The prototype had the following significant features:

| | |
|---|---|
| mounting strip 20 | 19 millimeters (0.75 inch) in width |
| layer 21 and back layer 24 | 20 pound bond paper, 0.1 millimeter (0.004 inch) in thickness |
| imperforate borders | 5.6 millimeter (0.23 inch) in width |
| pressure-sensitive adhesive layer 26 | 3M double-coated tape No. 109, 0.075 millimeter (0.003 inch) in thickness (a conventional adhesive) |
| external adhesive layer | 3M double-coated tape No. 665, 0.075 millimeter (0.003 inch) in thickness (conventional pressure-sensitive adhesive coatings) |

The openings 23 occupied more than 50% of the perforated area of the masking layer 21. A circle (the dotted circle 29 of FIG. 4) 6.3 millimeters (0.25 inch in diameter fit within each cow-shaped opening 23. The exposed face of the bond paper used for the masking layer 21 and the adhesive-contacting face of the back layer had been coated with contrasting fluorescent inks, that of the back layer being visible through the transparent pressure-sensitive adhesive layer 26. The fluorescent coating of the masking layer 21 afforded a dirt-resistant finish.

A length of the mounting strip 20 of Example 2 was wound upon itself to form a roll from which it could be readily unwound after prolonged storage at room temperature. A number of pieces of that and identical mounting strips were adhered by the external adhesive layer 27 (which was pressure-sensitive) to various flat, vertical surfaces including the side of a personal computer. A variety of pieces of paper were pressed with the fingertips against the mounted strips and remained securely in place for periods of several days without any of them becoming loose.

The present invention has now been described with reference to several embodiments thereof. It will be apparent to those skilled in the art that many changes can be made in the embodiments described without departing from the scope of the present invention. Thus the scope of the present invention should not be limited to the structures described in this application, but only by the structures described by the language of the claims and the equivalents of those structures.

What is claimed is:

1. A mounting laminate to which pieces of paper larger in area than openings on the laminate can be adhered by contact, said mounting laminate comprising:

a rectangular masking layer having an imperforate border portion and a perforate portion bounded on at least one side by the border portion, said perforate portion having a plurality of discrete openings that (a) extend substantially uniformly over the entire area of the perforate portion of the masking layer, (b) occupy at least 25% of the area of the perforate portion of the masking layer, (c) each have an area generally in the range of 0.316 to 3.88 square centimeters, (d) are each of a size such that a circle of from 6.5 to 20 millimeters in diameter fits within the opening, and (e) are spaced apart by not more than 15 millimeters, a back layer, and a tacky pressure-sensitive adhesive layer that (a) adheres the masking layer to the back layer and (b) extends and has an exposed face across each of the openings, which adhesive has a 90° Adhesion Value of at least 2 Newtons per 100 millimeters of width, said laminate having a thickness of from 0.05 to 0.5 millimeter and a Tabor stiffness of from 0.02 to 7.0 Tabor Stiffness Units.

2. A mounting laminate as defined in claim 1 wherein the spacing between adjacent openings is from 4 to 10 millimeters.

3. A mounting laminate as defined in claim 1 and having an overall thickness of from 0.1 to 0.2 millimeter.

4. A mounting laminate as defined in claim 3 wherein the masking layer provides at least 35% of the thickness of the laminate.

5. A mounting laminate as defined in claim 1 wherein the back layer has a Tabor stiffness of less than 3.0 Tabor Stiffness Units.

6. A mounting laminate as defined in claim 1 wherein the imperforate border portion is at least 13 millimeter in width.

7. A mounting laminate as defined in claim 1 wherein the exposed face of the back layer bears an external adhesive layer.

8. A mounting laminate as defined in claim 7 wherein the external adhesive layer is located only in areas of the back layer that are not aligned with said openings.

9. A mounting laminate as defined in claim 8 wherein the external adhesive layer extends only around the border portion of the masking sheet.

10. A mounting laminate as defined in claim 1 wherein the back layer comprises a plastic film selected from the group consisting of cellulose acetate, polyethylene, polypropylene, and bi-axially oriented polyethyleneterephthalate.

11. A mounting laminate as defined in claim 1 wherein the back layer is sufficiently flexible that the portion of the back layer extending across each opening is movable without breaking until a portion of the exposed face of said pressure-sensitive adhesive layer reaches the plane of the surface of the masking layer opposite said adhesive layer.

12. A mounting laminate as defined in claim 1 wherein the back layer is sufficiently flexible that the portion of the back layer extending across each opening is movable without breaking until at least 80% of the area of the exposed face of said pressure-sensitive adhesive layer at the opening reaches the plane of the surface of the masking layer opposite the adhesive layer.

13. A mounting laminate as defined in claim 1 wherein the 90° Adhesion Value of the pressure-sensitive adhesive layer is at least 4 Newtons per 100 millimeters of width.

14. A mounting laminate as defined in claim 1 wherein said pressure-sensitive adhesive layer is repositionable.

15. A mounting laminate as defined in claim 14 wherein said pressure-sensitive adhesive layer comprises solid, inherently tacky, elastomeric microspheres.

16. A mounting laminate as defined in claim 1 wherein said masking layer has a thickness of at least 0.08 millimeters.

17. A mounting laminate to which pieces of paper larger in area than openings on the laminate can be adhered by contact, said mounting laminate comprising:

a rectangular masking layer having a thickness of at least 0.08 millimeter, including an imperforate border portion that is at least 13 millimeter in width and a perforate portion bounded on at least one side by the border portion, said perforate portion has a plurality of discrete through openings that (a) extend substantially uniformly over the entire perforate portion of the masking layer, (b) occupy at least 25% of the perforate portion of the masking layer, (c) each have an area generally in the range of 0.316 to 3.88 square centimeters, (d) are each of a size such that a circle of from 6.5 to 20 millimeters in diameter fits within the opening, and (d) are spaced apart by from 4 to 10 millimeter, a back layer which is a plastic film and has a Tabor stiffness of less than 3.0 Tabor Stiffness Units, and a tacky, repositionable pressure-sensitive adhesive layer that (a) is substantially coextensive with the masking layer and back layer, (b) adheres the masking layer to the back layer, and (c) extends and has an exposed face across each of the openings, which adhesive has a 90° Adhesion Value of at least 2 Newtons per 100 millimeters of width, said backing layer being sufficiently flexible that each of the potions of the back layer extending across the openings are moveable without breaking until at least 80% of the area of the exposed face of said pressure-sensitive adhesive layer at the openings reaches the plane of the surface of the masking layer opposite the adhesive layer, said laminate having a uniform thickness of from 0.1 to 0.2 millimeters and a Tabor stiffness of from 0.02 to 7.0 Tabor Stiffness Units.

18. A mounting laminate as defined in claim 17 wherein said pressure-sensitive adhesive layer comprises solid, inherently tacky, elastomeric microspheres.

* * * * *